Jan. 5, 1943.  H. S. BOOTH  2,307,616
FUEL TANK
Filed Feb. 20, 1941  2 Sheets-Sheet 1

H. S. Booth  INVENTOR.
BY William H Brown
ATTORNEY.

Jan. 5, 1943.  H. S. BOOTH  2,307,616
FUEL TANK
Filed Feb. 20, 1941  2 Sheets-Sheet 2

H. S. Booth  INVENTOR.
BY William H Brown
ATTORNEY.

Patented Jan. 5, 1943

2,307,616

UNITED STATES PATENT OFFICE 2,307,616

FUEL TANK

Harold Simmons Booth, Cleveland Heights, Ohio

Application February 20, 1941, Serial No. 379,801

6 Claims. (Cl. 221—77)

This invention relates to fuel tanks and particularly to tanks adapted for carrying extra fuel for small motor boats and embodying means for facilitating the transfer of a mixture of lubricant and fuel to the regular fuel tank associated with the motor of such motor boats.

An object of the invention is to provide a tank of the type indicated which will afford greater convenience in use, avoid loss of fuel in transfer to the regular tank and facilitate delivery of a thorough mixture of fuel and lubricant. A further and more specific object is to provide improved means for mixing fuel and lubricant. A further object is to provide improved filter means and a novel combination of mixing and filter means. A still further object is the provision of compressed air fuel ejection through such filter means.

Figure 1:
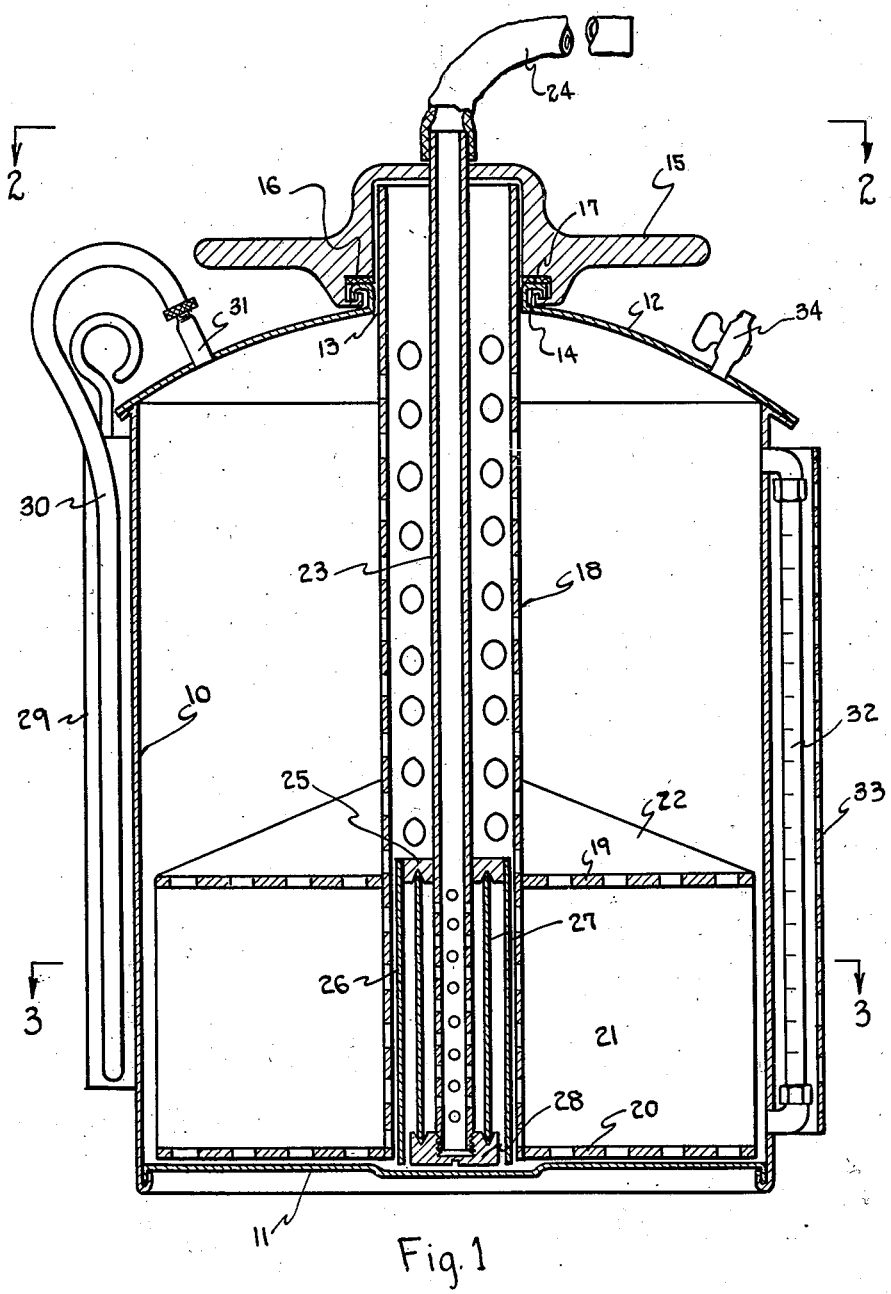
Figure 2:
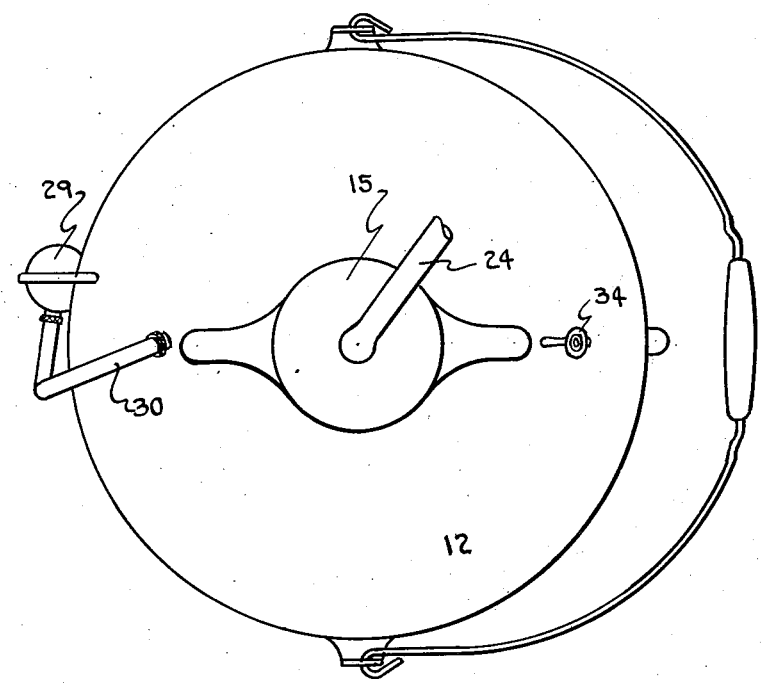
Figure 3:
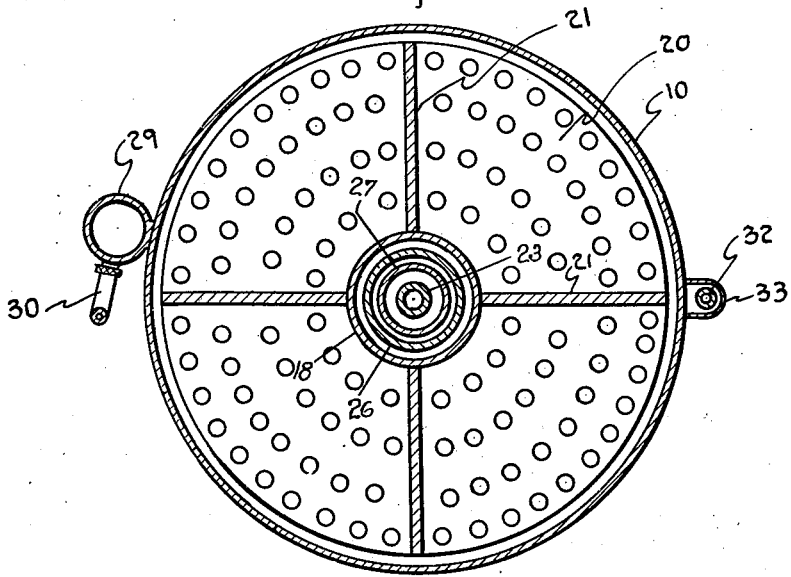

Other and more limited objects will be in part apparent and in part pointed out in connection with the accompanying drawings, wherein Fig. 1 is a central vertical section taken through a device embodying the invention; Fig. 2 is a top plan view corresponding to the line 2—2 of Fig. 1; and Fig. 3 is a horizontal section corresponding substantially to the line 3—3 of Fig. 1.

Referring now to the accompanying drawings, the numeral 10 indicates a tank or receptacle of generally cylindrical shape having a closed bottom wall 11 and a dome shaped top wall 12. The top wall 12 is provided centrally with an enlarged opening 13 having an upwardly and outwardly extending bead 14 modified at its edge to receive a closure 15. The closure 15 is removably connected to the bead 14 by any usual type of separable connection. A gasket 16 composed of deformable material is interposed between the upper surface of the bead 14 and a lower surface 17 of the closure 15.

In the receptacle 10 and projecting outwardly through the opening 13 is a perforated tube 18 which carries at its lower end perforated baffle elements 19 and 20 which are supported by plates 21 extending between the baffle elements 19 and 20 and plates 22 extending above the baffle element 19. The plates 21 and 22 are sealed or otherwise suitably secured to the tube 18. By reason of fact that the tube 18 extends at all times outwardly through the opening 13, it is possible, when the closure 15 is removed, to grasp the upper end of the tube 18 and thereby utilize the assembly consisting of such tube and baffle or agitating elements 19, 20 and 21 for the purpose of mixing, agitating or stirring the contents of the receptacle 10.

Sealed to the closure 15 is a conduit 23, the outer end of which carries a flexible tube 24 and the lower end of which carries a filter assembly. The filter assembly consists of an upper filter holding disk 25 permanently attached to the conduit 23 and carrying an enlarged tubular element 26 enclosing the filtering element 27. The conduit 23 is imperforate above the disk 25 and is perforated therebelow. Threaded on the lower end of the conduit 23 is a second filter holding disk 28, the filter 27, held between the elements 25 and 28, being of cylindrical shape and received in circular grooves in the elements 25 and 28.

Attached to one side of the receptacle 10 is an air pump 29 having its delivery conduit 30 connected through a check valve 31 to the interior of the receptacle 10. Communicating at top and bottom with the receptacle 10 is a gauge 32 which is composed of transparent material and preferably is graduated, so as to form a means of determining the amount of liquid in the receptacle. A shield 33 covers the gauge 32 and protects the same from mechanical injury. A shield 33 is provided with openings through which the glass element 32 can be seen.

In operation, the desired amount of lubricating fluid may be introduced through the tube 18 when the closure 15 is removed, and then a desired amount of gasoline or similar fuel is introduced, the gauge 32 being used in each case, if desired, to measure in the correct amount. The closure is then placed in position, the deformable tube 24 being closed off as by valve or clamp (not shown). When it is desired to transfer the fluid into the regular motor fuel tank, or at an earlier time not long enough to allow excessive stratification, the closure 15 is removed and the contents agitated by means of the tube 18 and the baffles carried thereby. The closure 15 is then replaced, the tube 24 is introduced into the receiving opening of the regular motor tank and air pressure is built up within the receptacle 10 by operation of the pump 29. Fluid passes under the influence of such air pressure into the motor fuel tank. When sufficient fluid has been transferred, the tube 24 is closed by means of the clamp or valve (not shown) and the pressure is released from the receptacle 10 by means of a relief valve 34. The flow of fluid under the influence of the air pressure is through the perforations in the tube 18 and into the open lower end of the sleeve element 26, thence through the filter element 27 and the perforations in the lower end of the conduit 23, and upwardly to the point of discharge through the tube 24.

It will be obvious from the foregoing that I have provided a device which is well adapted for its intended purpose, and while I have shown and described the present preferred embodiment of my invention, I wish it understood that numerous variations are possible within the scope of the invention, and I do not desire to be limited except in accordance with the scope of the appended claims and the requirements of the prior art.

Having thus described my invention, what I claim is:

1. A fuel tank comprising, in combination, a receptacular element having an opening in the normally upper wall thereof, a perforated tube movably received in and extending through said opening and carrying mixing means thereon, closure means closing said opening and with said receptacular element completely enclosing said tube, a conduit sealed through said closure means, and extending downwardly within said tube.

2. A fuel tank of the class described comprising, in combination, a receptacular element having an opening in the normally upper wall thereof, a perforated tube movably received in and extending through said opening and carrying mixing means thereon, closure means closing said opening and with said receptacular element completely enclosing said tube, a conduit sealed through said closure means, extending downwardly within said tube and carrying a filter inwardly of said closure.

3. A fuel tank of the class described comprising, in combination, a receptacular element having an opening in the normally upper wall thereof, a perforated tube movably received in and extending through said opening and carrying mixing means thereon, closure means closing said opening and with said receptacular element completely enclosing said tube, a conduit sealed through said closure means, extending downwardly within said tube and carrying a filter inwardly thereof and within said perforated tube, adjacent to the lower end thereof.

4. A fuel tank of the type described, the same comprising, in combination, a receptacular element having an opening therein, a closure for said opening, a filter carried by said closure, a stirrer in said receptacular element accessible for manual manipulation when said closure is open and inaccessible when said closure is closed, a conduit sealed through said closure and connected to said filter and means for forcing fuel through said filter and conduit to the outside of said tank.

5. A device according to claim 4 wherein said last mentioned means is an air pump.

6. A device according to claim 4 wherein said stirrer includes a tube extending through said opening and receiving said filter when said closure is in closed position.

HAROLD SIMMONS BOOTH.